May 4, 1965  J. M. BENSON  3,181,357
THERMAL FLOWMETER
Filed June 29, 1962  4 Sheets-Sheet 3

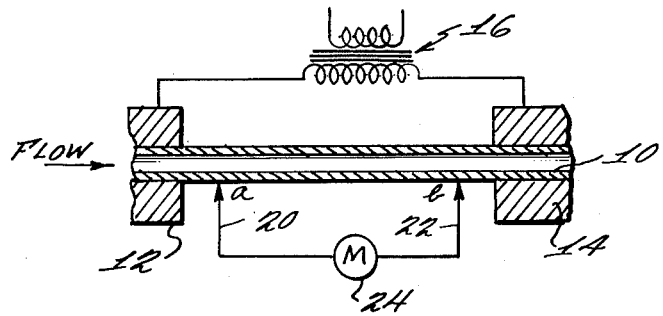
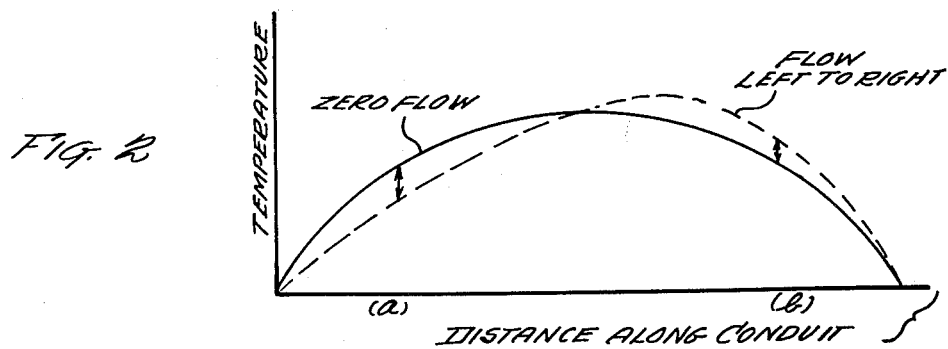
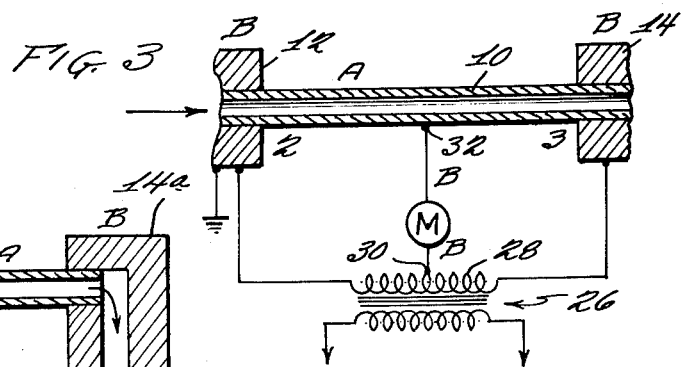
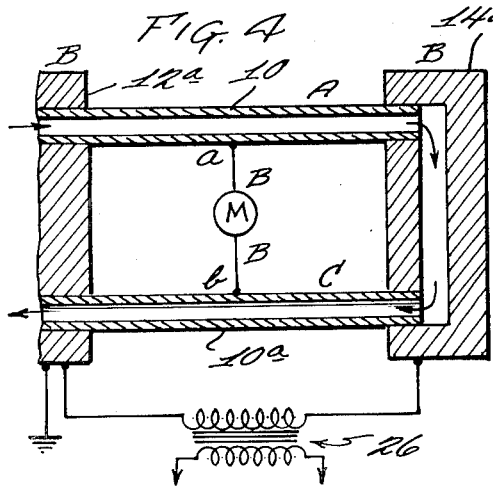

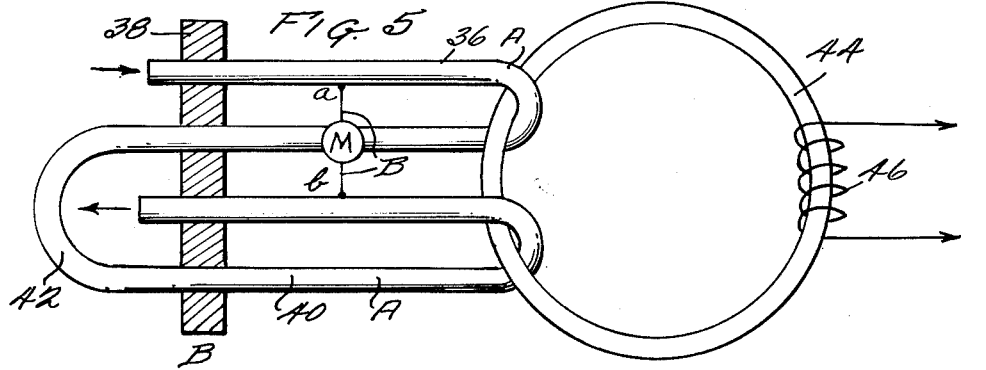
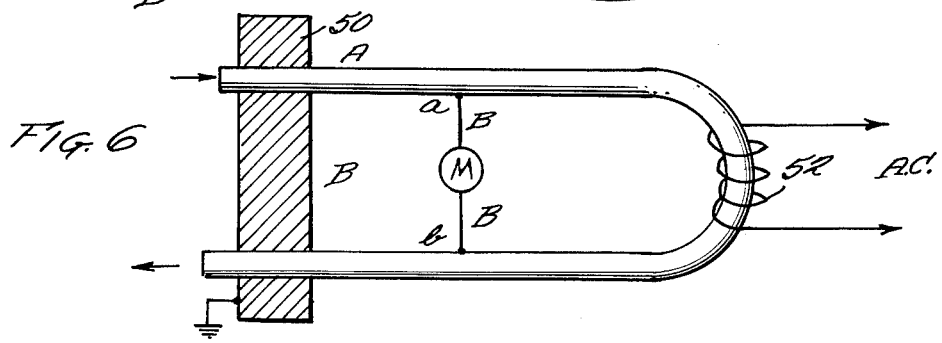
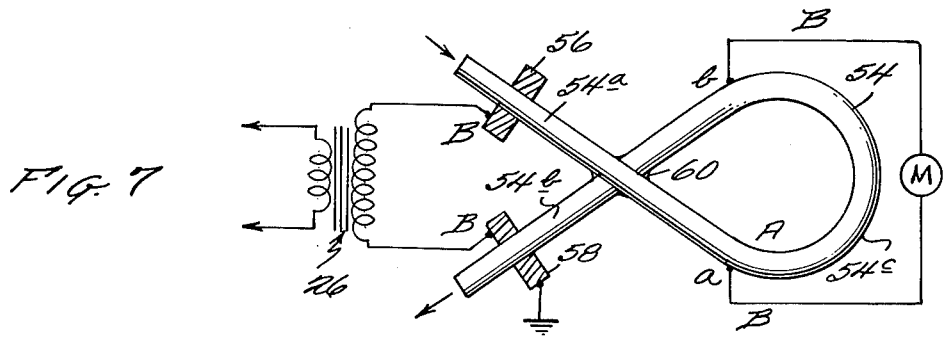
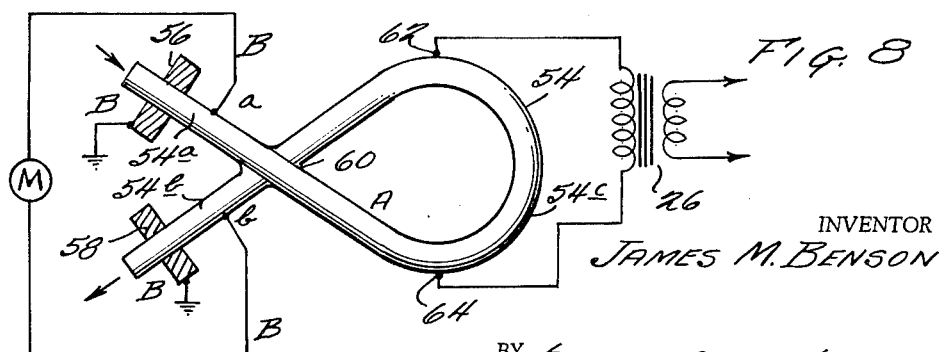

INVENTOR
JAMES M. BENSON
BY Cushman, Darby & Cushman
ATTORNEYS

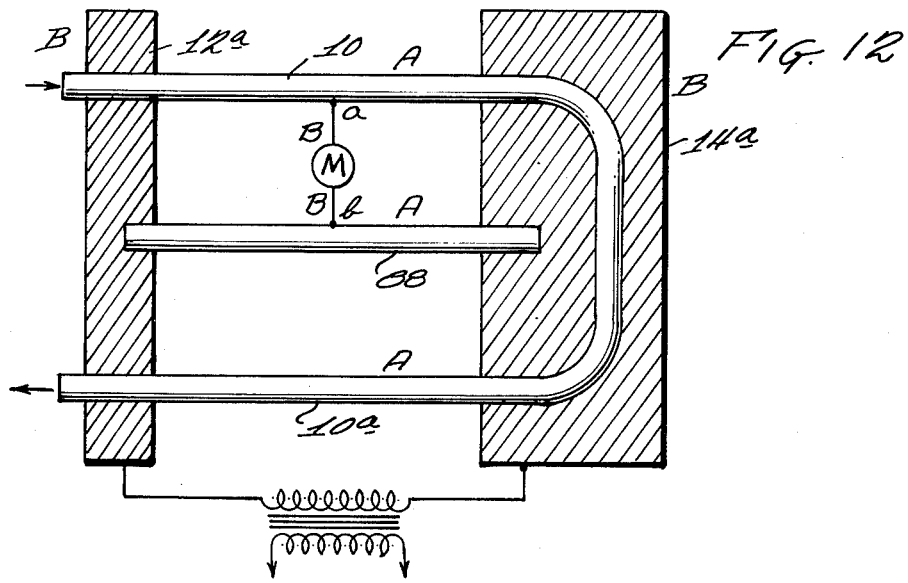
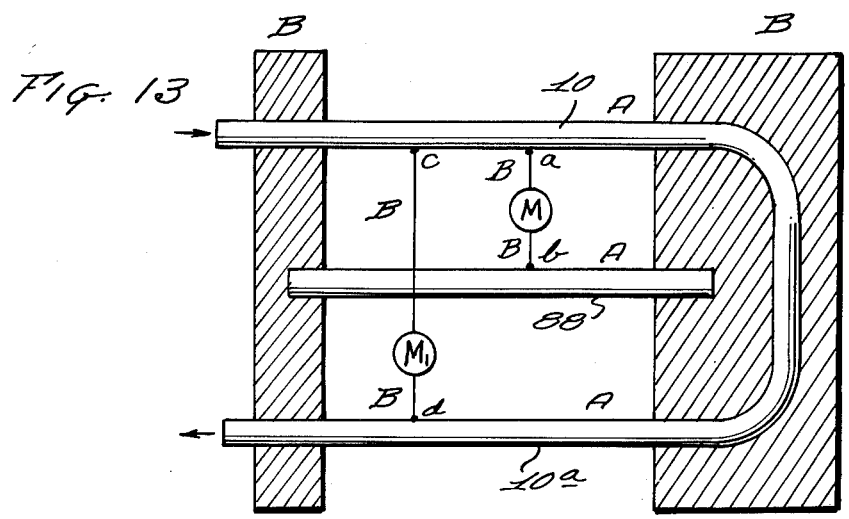
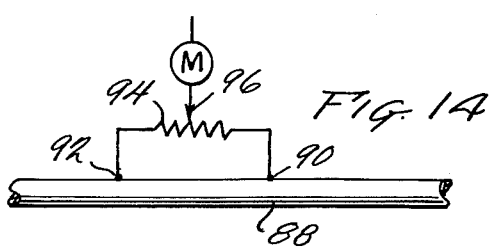
INVENTOR
JAMES M. BENSON
BY Cushman Darby & Cushman
ATTORNEYS 3,181,357
THERMAL FLOWMETER
James M. Benson, Hampton, Va., assignor to Hastings-Raydist, Inc., Hampton, Va., a corporation of Virginia
Filed June 29, 1962, Ser. No. 206,245
22 Claims. (Cl. 73—204)

This invention pertains to apparatus for measuring the flow of fluids, and particularly fluid flowmeters of the heated conduit type.

It has heretofore been known that if a fluid is flowed through a length of conduit which is heated and the temperature of one or more points along the conduit detected, the temperatures at these points will vary as some function of the direction and rate of flow of the fluid. It has further been known that the temperature of points along the conduit may be detected by affixing, as by welding at the desired points, conductors of metals dissimilar to the metal of the conduit, thereby forming thermocouple junctions. Nevertheless, the difficulty has been to make practical devices of this sort, particularly to overcome problems incident to electric heating current flowing through and adversely affecting the temperature measuring thermocouple circuits. Also there has been difficulty incident to passage of electric heating current through the conduits requiring certain portions of the conduit to be the elevated potentials above ground.

It is the general object of the present invention to overcome the aforesaid difficulties and to permit the use of thermocouple circuits to measure temperatures along the conduit without interference by heating currents.

Figure 9:
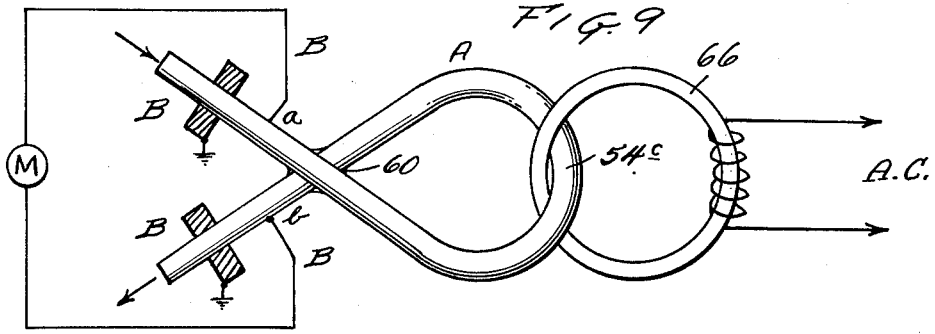
Figure 10:
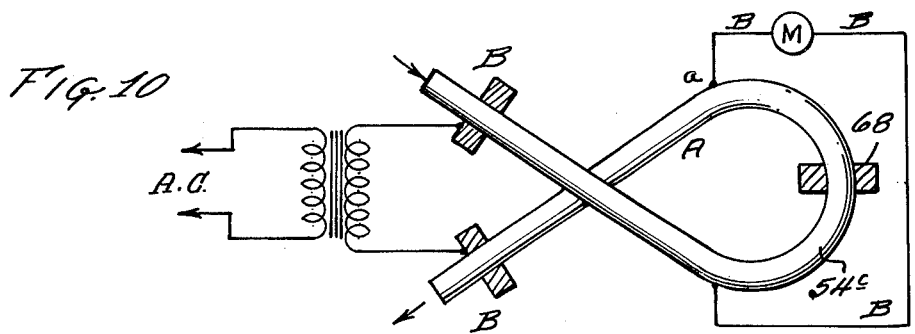
Figure 11:
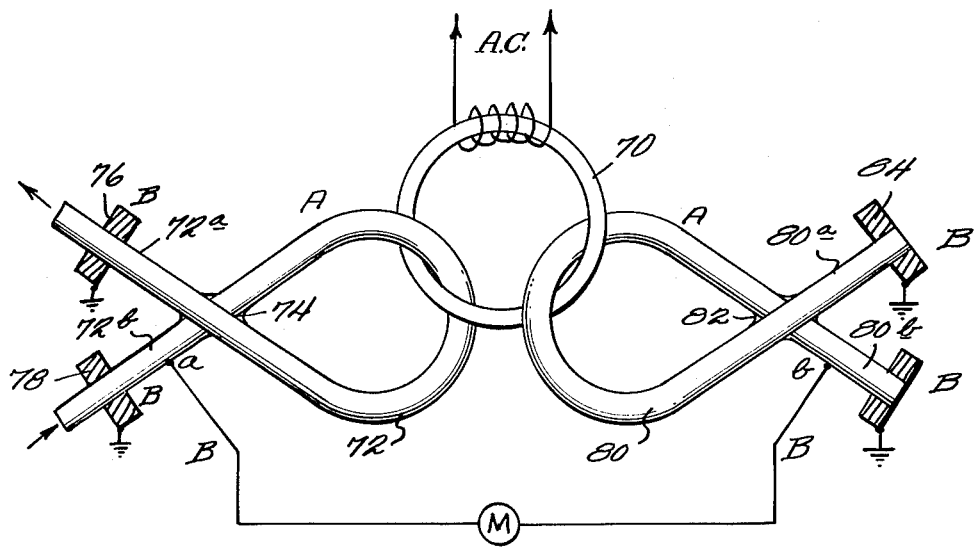

All of the several further objects of the invention will become fully apparent from the following description of illustrative embodiments of the invention, and from the appended claims. The illustrative embodiments of the invention may be best understood with reference to the accompanying drawings wherein:

FIGURE 1 shows a form of prior art apparatus of background interest to the present invention, FIGURE 2 shows typical temperature versus conduit length curves obtained in heated conduit flowmeters, FIGURE 3 shows a first embodiment of the present invention, FIGURE 4 shows a second embodiment of the present invention, FIGURE 5 shows a third embodiment of the present invention, FIGURE 6 shows a fourth embodiment of the present invention, FIGURE 7 shows a fifth embodiment of the present invention, FIGURE 8 shows a sixth embodiment of the present invention, FIGURE 9 shows a seventh embodiment of the present invention, FIGURE 10 shows an eighth embodiment of the present invention, FIGURE 11 shows a ninth embodiment of the present invention, FIGURE 12 shows a tenth embodiment of the present invention, FIGURE 13 shows an eleventh embodiment of the present invention, and FIGURE 14 shows a feature of the invention useful with all embodiemnts thereof.

For purposes of background information a previously known type of heated conduit flowmeter is shown in FIGURE 1. Here a length of conduit 10 of electrically and thermally conductive material is thermally and electrically coupled at its ends to heat sinks 12 and 14. By way of definition, a heat sink as referred to herein is a body of material of such mass that its temperature will remain substantially at the ambient temperature of its surroundings, and not be influenced by heating current being passed through it and the conduit. The conduit will be of lesser mass and will be heated above its ambient surroundings by passage of electrical heating current therethrough.

Continuing to refer to FIGURE 1, a transformer 16 delivers heating current to the conduit 10 by connection of the transformer secondary winding 18 to the ends of the conduits via the heat sinks 12 and 14. In FIGURE 1 the temperature of points $a$ and $b$ along the conduit are measured by wires 20 and 22 of like metal, say copper, but dissimilar to the metal of the conduit 10, say Constantan. As is well known a complete thermocouple circuit always comprises at least two junctions and the total thermoelectric potential generated in the circuit is the difference of the thermoelectric effect at the two junctions. In the circuit of FIGURE 1 one junction would be at point $a$ and the other at point $b$ and the meter M otherwise designated by reference character 24 will show, when suitably calibrated, the difference between the temperatures of the junctions at $a$ and $b$. However, in the apparatus shown in FIGURE 1 the meter M would also be influenced by some of the heating current flowing through it, inasmuch as the points $a$ and $b$ shown in conduit 10 will be at different potentials in respect to the circuit of the heating current.

FIGURE 2 shows a plot of the temperature gradient along a conduit as shown in FIGURE 1 for different conditions of fluid flow. The solid line curve shows a typical temperature gradient for zero fluid flow, while the dash lines show a typical curve of temperature gradient for flow of fluid from left to right as viewed in FIGURE 1. As depicted in FIGURE 2, when the flow builds up from zero the temperature along the first one-half of the conduit decreases, while that in the second one-half of the conduit increases. Of course, upon continued increase in the rate of fluid flow there will be a rate reached where the temperature of the entire conduit may become decreased. It is evident, then, that the characteristics of a flowmeter as illustrated in FIGURE 1 and having a temperature distribution along the conduit similar to that shown in FIGURE 2 will have a severe limitation in its use because a given reading of the meter M can be caused by two definite but widely different values of the flow. One value is relatively small and the other is much larger. The reading of the meter is ambiguous in that it will not be known which value of the flow is the true reading unless some additional means is employed.

Now turning to the embodiments of the present invention, the first is shown in FIGURE 3, wherein fluid is to flow from left to right through conduit 10 of material A which is secured at its ends in heat sinks 12 and 14 made of material B. For example, A could be Constantan and B copper. Transformer 26 is employed to drive heating current through the conduit by attachment of the ends of the secondary winding 28 to the heat sinks 12 and 14. However, winding 28 is tapped as at 30 wherefrom a conductor leads to meter M, the other lead of the meter proceeding to a thermocouple junction 32 upon the conduit. Assuming the winding 28 and the leads thereof to the heat sinks being of material B and also assuming the leads to the meter and the meter winding itself also to be of material B, one thermocouple junction between dissimilar materials A and B exists at 32. Two other junctions between materials A and B exists at each of the heat sink-conduit junctions. The latter form the well known "one-half" junctions in a so-called "third-law" thermocouple circuit. The net result of this arrangement is that the meter M (insofar as the thermocouple circuit is concerned) will read the difference in temperatures between the (like) temperatures at the heat sinks on the one hand, and the temperatures at 32 on the other hand.

In FIGURE 3 it is the intention that the location of point 32 along the conduit and the location of the tap 30 upon the winding 28, be selected so that the points 30 and 32 are at the same potential in respect to the circuit of the heating current. For example, point 32 could be one-half way along the conduit 10 and the point 30 a center tap of the winding 28. In any event, selection of points 30 and 32 as equipotential points prevents the flow of heating current in the meter. Accordingly, the latter reads only the thermocouple or temperature indicating current.

A possible disadvantage of the circuit of FIGURE 3 is that the outlet end of the conduit must be at a potential different from the potential of the inlet end of the conduit. While one end of the conduit may be grounded, unavoidably the other end must be at a greater potential. This may be a disadvantage, or in fact dangerous depending upon the voltage across the secondary winding 28 of the transformer. This difficulty is overcome in the circuit of FIGURE 4.

In FIGURE 4 conduit 10 extends between heat sinks 12a and 14a. However, there is means at heat sink 14a, such as passage 34 therein, for delivering the fluid into a further conduit 10a which proceeds back to heat sink 12a. Heating current from transformer 26 is applied to the heat sinks 12a and 14a thereby placing the conduits 10 and 10a in parallel in respect to carrying heating current. The meter M is now connected by leads to a junction point a upon conduit 10 and a junction point b upon conduit 10a. Points a and b are located along the conduits 10 and 10a so as to be at equipotential points in respect to the heating current, wherefore no heating current will flow through meter M. Assuming the meter coil and the leads therefrom to points a and b to be of a given material B, say copper, but the conduit 10 to be of a dissimilar material A, say Chromel, and the conduit 10a to be of a still dissimilar material C, say Alumel, the meter will show the difference in temperature between the points a and b, which form the two junctions of the thermocouple circuit. While dissimilar materials A and C are joined via material B at heat sinks 12a and 14a, these junctions, being at the same temperature, in end result cancel out in respect to thermoelectric voltages. Thusly, by the apparatus in FIGURE 4, the meter reads only thermoelectric currents, but at the same time the inlet and outlet for fluid flow are both at the same potential, which may be ground. It will furthermore be noted that the points a and b need not be at the mid points of the conduits 10 and 10a but may be at other (although similar) positions along the conduits in respect to distances to the heat sinks 12a and 14a. However, inasmuch as the flow of fluid is proceeding from left to right in conduit 10 and from right to left in conduit 10a the temperature at point a will be "upstream" of the center of the conduit 10 while the point b will be "downstream" of the center of the conduit 10a. Thus readings along a curve analogous to those depicted in FIGURE 2 are possible, although one reading is being taken in one conduit section and the other in the other conduit section.

It will be observed in FIGURE 4 that the conduit 10a could be of the same material of conduit 10 with no difference in result and FIGURE 4 simply demonstrates that the conduit 10a may be of a different material from conduit 10. Of course, the different thermoelectric potentials of given pairs of dissimilar materials must be taken into account where three or more materials are used.

FIGURE 5 shows a flowmeter according to the invention wherein a conduit 36 extends as a loop with both ends embedded in a heat sink 38. There is also a conduit 40 extending in a loop similar to that of conduit 36, again with both ends embedded in heat sink 38. Fluid enters one end of conduit 36 and the opposite end of conduit 36 is joined by auxiliary conduit 42 with one end of conduit 40. The remaining end of conduit 40 is the outlet from the apparatus. A meter M is connected by the junction a on conduit 36 and a similarly located junction b on conduit 40. A core 44 of magnetic material is linked through both of loops 36 and 40, and also has wound thereabout a winding 46 for carrying an alternating current. In operation, the core 44 serves to induce like heating currents in the conduit loops 36 and 40. Taking the meter winding and the leads thereof to junctions a and b of a given material, and the conduits 36 and 40 of dissimilar material with respect to the meter circuit, the meter will measure the difference in temperature between points a and b. If the latter points are at points of equipotential in respect to the heating current passing through the conduits 36 and 40, then the heating current does not affect the meter. Beyond this the operation and results are the same as are obtained in the device of FIGURE 4.

FIGURE 6 shows another form of the invention, wherein conduit 48 extends as a loop from heat sink 50 and meter M, having coil and leads of dissimilar material dissimilar to conduit 48, extends from junction points a and b on the conduit 48. A winding 52 is wound about the conduit at the central extremity of the loop, and this is energized by alternating currrent preferably at high frequency, say in excess of 1,000 cycles per second. In accordance with the laws of electromagnetic action, the current in winding 52 induces only local heating currents in the conduit, which travel about the periphery thereof and do not travel through the conduit loop. Accordingly, no heating current flows through the meter circuit between the junctions a and b and the basic purposes of the present invention are achieved.

A still further form of the invention is shown in FIGURE 7 wherein conduit 54 extending between heat sinks 56 and 58 is in contact with itself at a cross over joint 60, the latter being a junction in respect to both thermal and electrical contact. Heating currrent generated in the secondary of transformer 26 is delivered to the heat sinks 56 and 58, and heating current flows through the legs 54a and 54b of the conduit between the heat sinks and the junction 60. As for the remainder of the conduit 54 which is the loop 54c, heat will be delivered by conduction equally outwardly along the conduit from the junction 60. The meter M is connected to the conduit loop 54c at points a and b but it will be noted that these points are out of the circuit of the heating current and therefore the meter is not affected by the heating current and only reads the difference in temperature between points a and b, again it being assumed that the meter coil and the leads to points a and b are of material dissimilar to that of the conduit 54.

A modification of the device of FIGURE 7 is shown in FIGURE 8, this permitting both of the heat sinks 56 and 58 to be at the same potential. This result is achieved by having the secondary of the heating currrent transformer connected to the conduit at spaced apart points on the loop portion 54c, as at points 62 and 64. Now the heating current flows only in the conduit in the loop portion 54c, and the short circuiting connection at point 60 prevents the flow of heating current in the conduit legs 54a and 54b which extend from the joint 60 to the heat sinks 56 and 58. The meter leads are connected at points a and b to the conduit legs 54a and 54b respectively. Again, having the meter leads and meter coil of material dissimilar to the conduit 54 permits the meter to read solely the difference in temperature of the conduit at points a and b.

FIGURE 9 shows an embodiment of the apparatus similar to that of FIGURE 8 but wherein a magnetic core 66 linked through the loop 54c generates a heating current in the latter.

FIGURE 10 shows an apparatus similar to that of FIGURE 7 but with a third heat sink 68 located on the conduit in the loop portion 54c at the midpoint thereof diametrically opposite the shorting junction 60. Provision of heat sink 68 at this place insures that heat delivered into loop 54c via contact 60 will be conducted substantially evenly in the two sides of the loop under no flow conditions and under this condition a and b would be at like temperatures.

FIGURE 11 shows an embodiment of the invention which is a development of the embodiments of FIGURES 7–10 to the extent that a suitable means such as a magnetic core 70 is employed to induce a heating current in a loop of conduit 72 shorted at 74, the conduit extending in legs 72a and 72b to heat sinks 76 and 78, respectively, both of which may be grounded. However, to eliminate any zero drift of the meter due to ambient temperature and pressure changes or changes in applied heating voltages and any ambiguity in reading both low and high rates of flow, an entirely similar conduit system including a conduit 80 in a loop shorted at 82 and with heat sinks 84 and 86 is provided, the latter being grounded. Whereas fluid is to flow through conduit 72, conduit 80 is not supplied with fluid flow at any time. Nevertheless, the entire arrangement is subjected to the same ambient or surrounding conditions. The meter M in this case has a thermocouple junction a on a leg of the conduit 72, such as leg 72b leading to heat sink 78, while the other lead of the meter has a junction as at c on a corresponding leg 80b of the conduit 80. Inasmuch as the heat sinks are all grounded, there is a return path therethrough for the thermoelectric currents. The points a and b are clearly outside the path of the heating currents and the meter cannot be affected thereby. In connection with FIGURE 11, and with reference back to FIGURE 9, it will be seen that in the latter, excess flow will cool both junctions a and b and may result in ambiguous readings. However, the apparatus as shown in FIGURE 11 serves to eliminate any zero drive and ambiguity.

Still another embodiment of the invention is shown in FIGURE 12. This is a structure similar to that in FIGURE 4 except that a third length of conduit 88 extends between the heat sinks 12a and 14a. There is no flow through conduit 88. The meter M extends between a junction a on conduit 10 and a junction b on conduit 88, both a and b being at equipotential points with respect to the heating currrent now flowing in parallel through all of conduit sections 10, 10a and 88. The meter M measures the tempertaure difference between a which is affected by fluid flow and b which is not affected by flow. This provides a stable zero reading at zero flow independent of ambient temperature and heating power. Additionally, excess flow causes no ambiguity in the meter reading.

FIGURE 13 shows an embodiment similar to that of FIGURE 12 except that an additional meter M is added, reading temperature between point c on conduit 10 and d on conduit 10a. This embodiment provides a dual range flowmeter because meter M measures flow at high rates without ambiguity while meter $M_1$ measures low rates of flow with high sensitivity although it may become ambiguous at high rates. It may be explained that points a and c may coincide and use a single thermoelectric junction if desired. Moreover, meters M and $M_1$ may in fact be a single meter with a transfer switch if desired.

FIGURE 14 shows a modification which may be applied to the embodiments of FIGURE 12 or 13 or in fact any other of the embodiments. This is to provide for a simulated adjustment of a thermoelectric junction along a conduit, taking as an example a modification of the junction b along the conduit 88. Two spaced apart junctions 90 and 92 would be provided, with leads of a given material, say copper, leading to a resistor 94, there being an adjustable tap 96 thereon leading to the meter M. In this way, by adjustment of the tap 96, the movement of a single thermoelectric junction along the conduit 88 may be readily simulated.

It is to be understood that the various embodiments of the invention have been described in detail only for the purpose of illustration, and no specific limitation thereto is intended. The scope of the present invention is to be determined from the appended claims.

What is claimed is:

1. In a fluid flowmeter, a section of electrically and thermally conductive conduit of given length for flow of fluid therethrough having first and second ends, heat sink means thermally coupled to said conduit ends, means for heating the conduit section intermediate said ends by passage of electrical heating current through the material forming said conduit in at least a portion of said conduit section intermediate said ends, and a thermocouple circuit for measuring the temperature of at least one point spaced between the heat sinks and along the length of said conduit section, the thermocouple circuit having at least a portion of the conduit as a part thereof and connected with the conduit at at least one dissimilar material thermocouple junction so positioned along the conduit section in respect to the circuit of the heating current as to preclude passage of heating current through the portion of the thermocouple circuit external to the conduit.

2. A fluid flowmeter as in claim 1 wherein the heating current circuit includes a current source connected across the conduit ends and the thermocouple circuit includes a first junction at a point along the conduit and a second junction at a point of equipotential in the current source.

3. A fluid flowmeter as in claim 2 wherein the current source is a transformer tapped at a suitable potential point to provide a null balance of the heating current in the thermocouple measuring circuit.

4. A fluid flowmeter as in claim 1 having a second conduit between said heat sinks and communicating with the first conduit at one of said heat sinks whereby fluid enters and leaves the conduit system at one of said heat sinks.

5. A fluid flowmeter as in claim 4 wherein a source of heating current is connected across the heat sinks thus placing the conduits in parallel, and the thermocouple circuit joins the conduits at a thermocouple junction along each conduit at equipotential points therealong with respect to the heating current circuit.

6. A fluid flowmeter as in claim 4 wherein the thermocouple junctions on the conduits are located closer to one heat sink than the other.

7. A fluid flowmeter as in claim 1 wherein the conduit is extended through one heat sink to a third heat sink, a source of heating current is connected in parallel across the pairs of heat sinks serving the respective conduits, and the thermocouple circuit joins the conduits at a thermocouple junction along each conduit section at equipotential points therealong with respect to the heating current circuit.

8. A fluid flowmeter as in claim 7 wherein the thermocouple junction on the conduits are located at heating current-equipotential points on the conduits other than the mid-points thereof.

9. In a fluid flowmeter, a first section of electrically and thermally conductive conduit for flow of fluid therethrough having first and second ends each thermally coupled to a heat sink, means electrically connecting the first conduit near its ends to form a first electrical loop with the conduit, a second section of electrically and thermally conductive conduit for flow of fluid therethrough having first and second ends each thermally coupled to a heat sink, means electrically connecting the second conduit near its ends to form a second electrical loop with said second conduit, a magnetizable core member linking through both of said loops, means for driving said core as a transformer core for generating circulating heating currents in the two conduit loops, means for passing fluid from the second end of the first conduit section to the first end of the second conduit section for serial fluid flow through the conduit sections, and a thermocouple circuit having thermocouple junctions one on each conduit loop at equipotential points thereon in respect to the heating currents.

10. In a fluid flowmeter, a section of electrically and thermally conductive conduit of given length for flow of fluid therethrough having first and second ends, heat sink means thermally coupled to said conduit ends, means for heating the conduit section intermediate said ends by passage of electrical heating current through the material forming said conduit in at least a portion of said conduit section intermediate said ends, the just recited heating means comprising induction means for generating local currents in a confined length of the conduit, and a thermocouple circuit for measuring the temperature of at least one point along the length of said conduit section, the thermocouple circuit having at least a portion of the conduit as a part thereof and connected with the conduit at at least one dissimilar material thermocouple junction so positioned along the conduit section in respect to the circuit of the heating current as to preclude passage of heating current through the portion of the thermocouple circuit external to the conduit.

11. A fluid flowmeter as in claim 10 wherein a common heat sink serves both ends of the conduit, and a winding for fluctuating current is wound about a portion of the conduit loop extending from the heat sink for inducing heating current into said conduit.

12. In a fluid flowmeter, a section of electrically and thermally conductive conduit of given length for flow of fluid therethrough having first and second ends, the conduit section being formed in a loop thereby electrically contacting itself at a point intermediate its ends, heat sink means thermally coupled to said conduit ends, means for heating the conduit section intermediate said ends by passage of electrical heating current through the material forming said conduit in at least a portion of said conduit section intermediate said ends, and a thermocouple circuit for measuring the temperature of at least one point along the length of said conduit section, the thermocouple circuit having at least a portion of the conduit as a part thereof and connected with the conduit at at least one dissimilar material thermocouple junction so positioned along the conduit section in respect to the circuit of the heating current as to preclude passage of heating current through the portion of the thermocouple circuit external to the conduit, the thermocouple circuit joining the conduit circuit at spaced apart junctions upon the conduit.

13. A fluid flowmeter as in claim 12 wherein a source of heating current is connected across the heat sinks and the thermocouple junctions are located along the said conduit loop.

14. A fluid flowmeter as in claim 13 and including a further heat sink coupled to the conduit midway in the loop formed thereby.

15. A fluid flowmeter as in claim 12 wherein a heating current is generated in the conduit loop and the thermocouple junctions are positioned one on each length of conduit between its heat sink and the cross-over point of the conduit.

16. A fluid flowmeter as in claim 15 and including a magnetic member driven as a transformer core and linking through said conduit loop to generate said heating current therein.

17. A fluid flowmeter as in claim 12 wherein a heating current is generated in the conduit loop, and wherein the thermocouple circuit joins the conduit at a junction upon a length of the conduit between a heat sink and the conduit cross-over.

18. A fluid flowmeter as in claim 17 wherein a second looped conduit is provided identical to the first mentioned except not for fluid flow, the heat sinks of both conduit sections being electrically interconnected, means for generating a corresponding heating current in the second conduit loop, and the thermocouple circuit having a second junction upon a length of conduit between a heat sink and cross-over thereof at a position therealong corresponding to the position of the first thermocouple junction whereby ambient temperature changes are compensated in the thermocouple circuit.

19. A fluid flowmeter as in claim 12 wherein a magnetic transformer core links both conduit loops for generating like heating currents in both loops.

20. In a fluid flowmeter, a section of electrically and thermally conductive conduit of given length for flow of fluid therethrough having first and second ends, heat sink means thermally coupled to said conduit ends, means for heating the conduit section intermediate said ends by passage of electrical heating current through the material forming said conduit in at least a portion of said conduit section intermediate said ends, and a thermocouple circuit for measuring the temperature of at least one point along the length of said conduit section, the thermocouple circuit having at least a portion of the conduit as a part thereof and connected with the conduit at at least one dissimilar material thermocouple junction so positioned along the conduit section in respect to the circuit of the heating current as to preclude passage of heating current through the portion of the thermocouple circuit external to the conduit, having second and third sections of similar conduit of like length extending between said heat sinks, the ends of the first and second conduits communicating at one heat sink for return of fluid via the second conduit to an outlet at the other heat sink, the third conduit not connected to convey fluid, means for connecting the source of heating current across said heat sinks thus placing the three conduit sections in parallel to carry heating current, the thermocouple circuit having one junction on one of the conduit sections and a second junction on another of the conduit sections.

21. A fluid flowmeter as in claim 20 wherein one junction of the thermocouple circuit is on one of the first or second conduit sections and a second junction is on the third conduit section.

22. A fluid flowmeter as in claim 1 wherein the thermocouple junction is formed by two junction points spaced apart along the conduit and joined by a resistor having an adjustable tap whereby adjustment of the tap simulates movement of a single junction along the conduit for selecting a point from which heating current in the conduit will not be diverted into the thermocouple circuit.

References Cited by the Examiner
UNITED STATES PATENTS

| | | | |
|---|---|---|---|
| 2,349,673 | 5/44 | Pearson | 73—204 |
| 2,446,283 | 8/48 | Hulsberg | 73—204 |

FOREIGN PATENTS

| | | |
|---|---|---|
| 1,078,592 | 5/54 | France. |
| 601,298 | 5/48 | Great Britain. |

RICHARD C. QUEISSER, *Primary Examiner.*

EMIL G. ANDERSON, *Examiner.*